A. JOHNSON.
COOKER.
APPLICATION FILED MAR. 6, 1917.
1,275,040.
Patented Aug. 6, 1918.
3 SHEETS—SHEET 1.
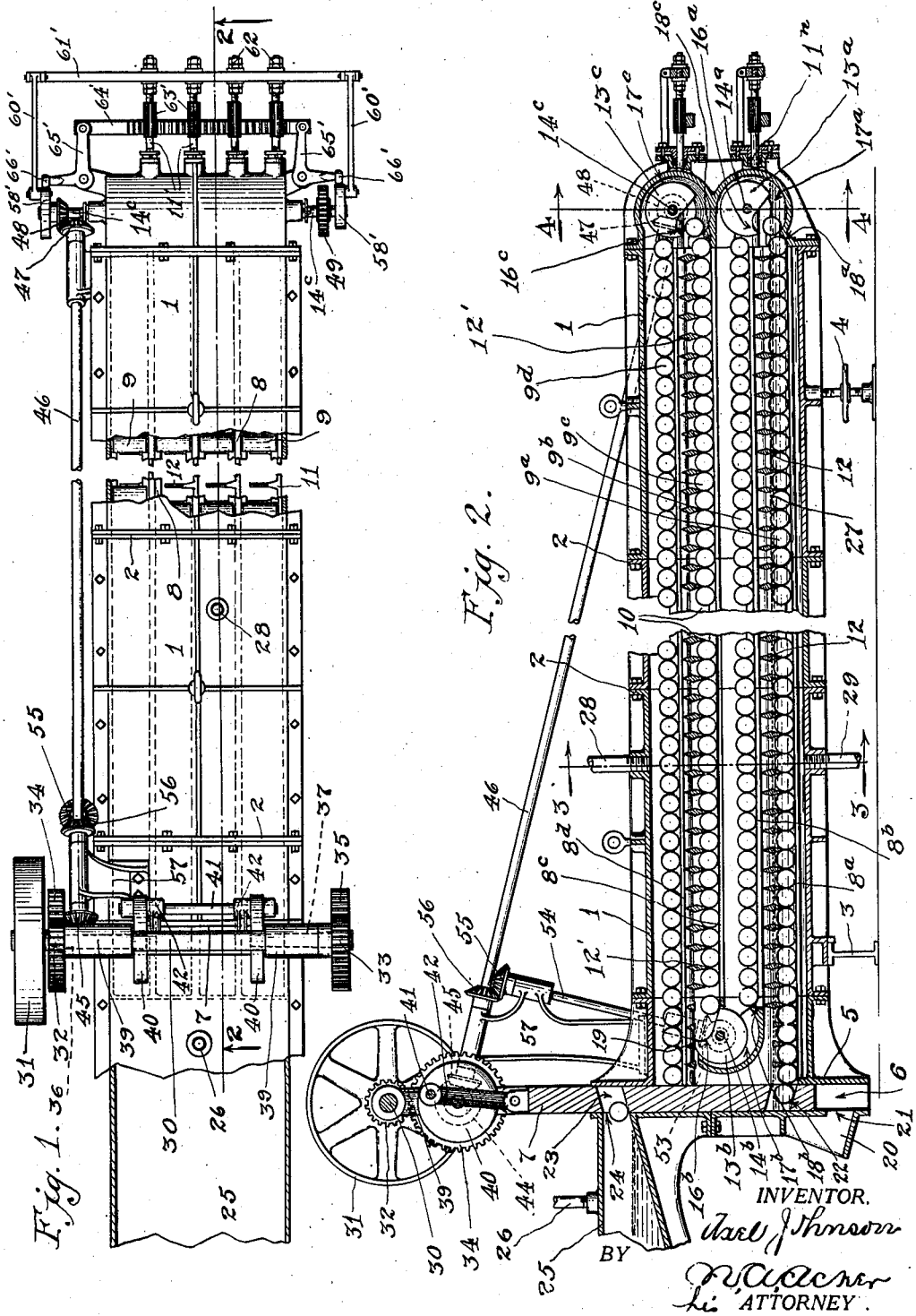
INVENTOR.
Axel Johnson
BY
[signature]
ATTORNEY.

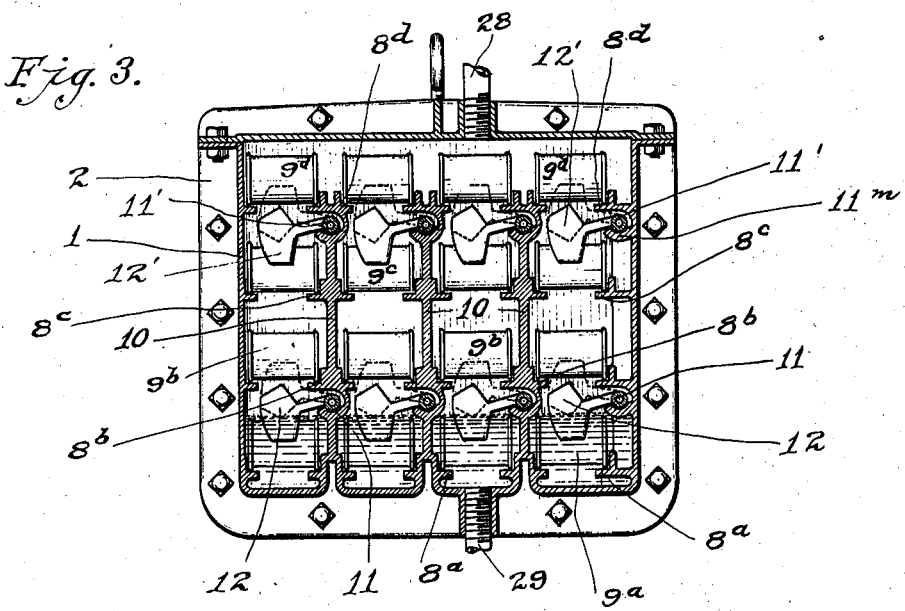
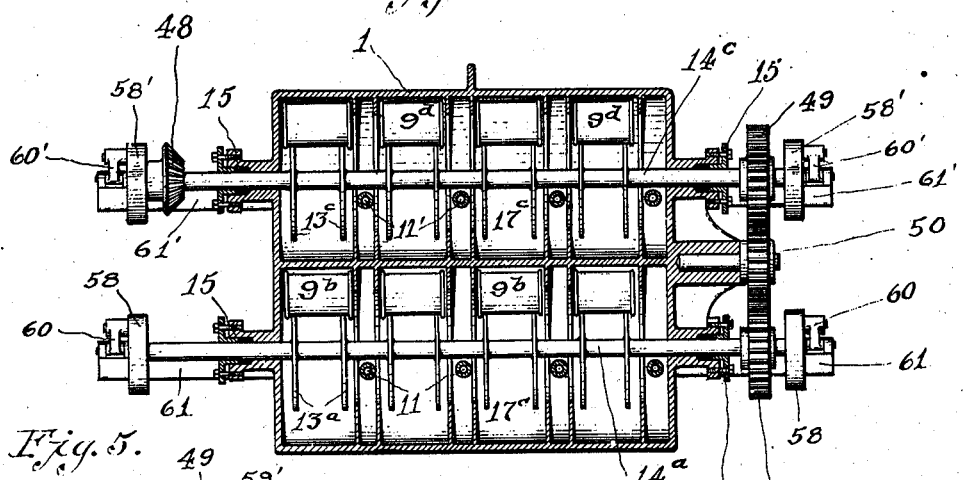
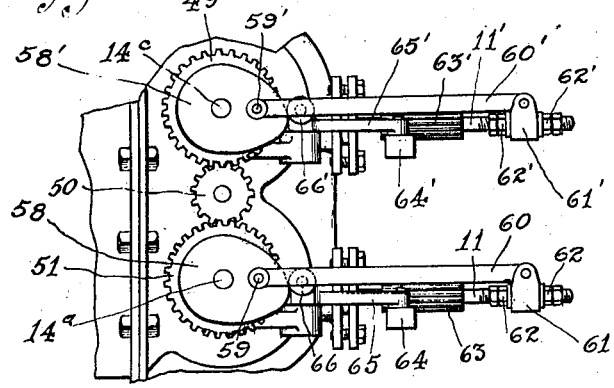

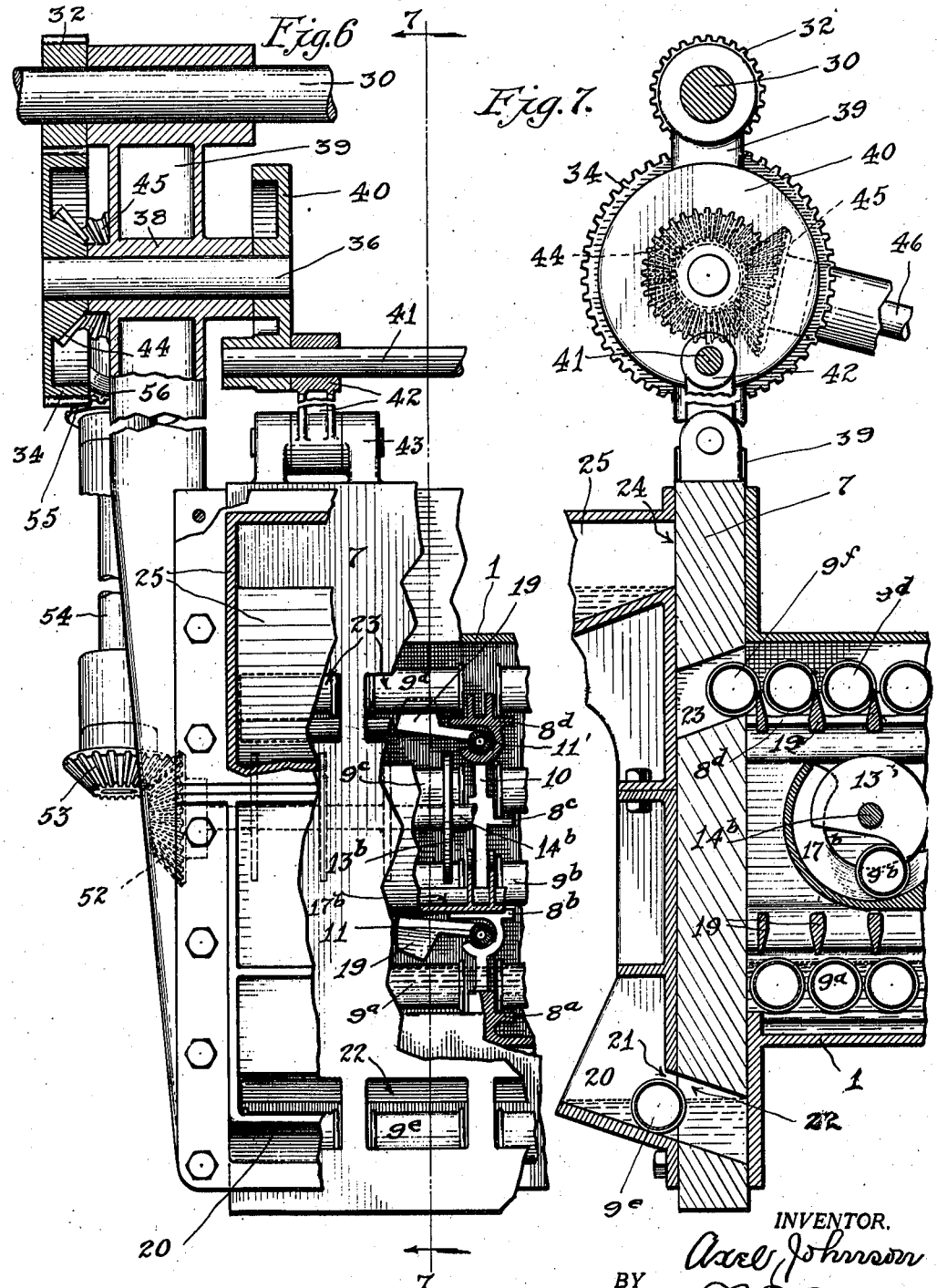

UNITED STATES PATENT OFFICE.

AXEL JOHNSON, OF OAKLAND, CALIFORNIA.

COOKER.

1,275,040.         Specification of Letters Patent.         Patented Aug. 6, 1918.

Application filed March 6, 1917. Serial No. 152,490.

*To all whom it may concern:*

Be it known that I, AXEL JOHNSON, a citizen of the United States, residing at Oakland, in the county of Alameda and State of California, have invented certain new and useful Improvements in Cookers, of which the following is a specification.

The present invention relates to a cooker for giving the final cook to canned food materials.

The object of the invention is to provide a cooker of large capacity which is capable of handling a large number of cans at one time and in which the cans are advanced in a tortuous path from the inlet to the outlet with the least possible expenditure of energy. A further object of the invention is to provide a simple feed and discharge valve for feeding the cans into the cooker and discharging the same therefrom with the least possible loss of heat from within the cooker.

In order to comprehend the invention, reference should be had to the accompanying sheets of drawings, in which:

Figure 1, is a plan view of my cooker.

Fig. 2, is a sectional elevation of the same taken on the line 2—2 of Fig. 1 and viewed in the direction of the arrows.

Fig. 3 is a transverse section, enlarged, taken in the direction of the arrows on the line 3—3 of Fig. 2.

Fig. 4 is a similar section, enlarged, taken on the line 4—4 of Fig. 2 and viewed in the direction of the arrows.

Fig. 5 is an elevational detail of the advance bar drive mechanism shown at the right of Fig. 4.

Fig. 6 is a part sectional transverse elevation, enlarged of the valve drive mechanism.

Fig. 7 is a section taken in the direction of the arrows on the line 7—7 of Fig. 6.

In the drawings, the reference numeral 1 designates the cooker tank, comprising a relatively long rectangular inclosure, preferably formed of a plurality of sections united together by adjacent flanges 2, formed at the ends thereof. By this construction, the cooker tank may be made any desired length by the employment of additional sections in order to provide the requisite length of time for the cook. The tank 1 is shown in Fig. 2 of the drawings as supported near one end by a fixed member 3, and near the other end by an adjustable leveling post 4.

At one end, the tank 1 Fig. 2 of the drawings, terminates in a casting 5 having a vertically disposed rectangular valve-way 6 therein with which is a vertically slidable valve 7, Figs. 1, 6 and 7 of the drawings, which operates to control the admission and discharge of the cans in a manner to be presently described. The tank 1, as herewith illustrated, is provided with lineally disposed run-ways for the cans, there being four of said run-ways in the width of the tank and four in the height thereof, each vertical stack of four superposed run-ways forming a single path for the advance of the cams thereupon. As shown in Fig. 3 of the drawings, the cam run-ways are formed by means of flanges $8^a$, $8^b$, $8^c$ and $8^d$, upon which the cans 9, in a horizontal position, are adapted to roll, said run-ways being suitably supported by the side walls of the tank 1 and by interior lineally disposed walls 10. The four run-ways, each comprising the flanges $8^a$, $8^b$, $8^c$ and $8^d$, are identical in construction and operation, there being four cans admitted to the machine simultaneously and four simultaneously discharged therefrom. The following description therefore will be confined to one run-way, comprising the vertical bank of four superposed tracks, it being understood that such description applies equally to the other run-ways.

Positioned between the lower pair of tracks $8^a$ and $8^b$, and slightly to one side thereof, is a lineally disposed rod 11, Figs. 3, 4 and 5 of the drawings, and a similar rod 11' is similarly disposed with respect to the upper pair of can tracks $8^c$ and $8^d$. These rods, 11 and 11', which are mounted within pockets $11^m$ in the tank wall, extend the entire length of the cooker tank, projecting from the rear end thereof through suitable packing glands $11^n$, as shown in Fig. 2, and are mounted for both lineal sliding movement and rotary oscillating movement. The rods 11 and 11' are provided with a plurality of spaced laterally extending can engaging dogs 12 and 12' respectively, Figs. 2 and 3 of the drawings. Said dogs are so formed, that, by the oscillation of their respective carrying rods 11 and 11', they are caused to engage either the cans $9^a$ and $9^c$ in the first and third tracks $8^a$ and $8^c$ respectively, or the cans $9^b$ and $9^d$ in the second and fourth tracks $8^b$ and $8^d$ respectively; and said dogs are spaced upon their carrying rods by a distance equal to or very slightly greater than the diameter of the cans. Therefore, as shown in Fig. 2 of the drawings, the tracks are filled by solid lines of cans, each of said cans being engaged by one of the dogs 12 or 12'. The lineal reciprocating movement of the rods 11 and 11' is equal to the distance between centers of the cans within the run-ways, that is, equal to or very slightly greater than the diameter of the cans; and the oscillating and reciprocating movements of said rods 11 and 11' are so correlated, that by the rearward movement of said rods, that is, toward the right, as shown in Fig. 2, of the drawings, the dogs 12 and 12' occupy their lower positions and engage the cans $9^a$ and $9^c$, lying in the run-ways $8^a$ and $8^c$ respectively, and by the forward movement of said rods, that is, toward the left, as shown in Fig. 2, the dogs 12 and 12' occupy their upper positions and engage the cans $9^b$ and $9^d$ upon the run-ways $8^b$ and $8^d$ respectively. Thus, the cans in the first and third tracks are advanced one step, that is, the diameter of one can, by the rearward movement of the rods 11 and 11', and the cans in the second and fourth tracks are advanced one step in the opposite direction by the forward movement of said rods.

At the ends of the can tracks, the cans are elevated and transferred from one track to the track next above, by means of transfer wheels $13^a$, $13^b$ and $13^c$, Fig. 2 of the drawings. Said wheels, as shown in Fig. 4 of the drawings, comprise spaced disks mounted upon transversely disposed rotatable shafts $14^a$, $14^b$ and $14^c$, the shaft $14^b$ appearing in Figs. 2 and 7 only. Said shafts are suitably journaled in the sides of the cooker tank and are preferably provided with packing glands 15 to prevent the escape of steam and water through said journals, as shown in Fig. 4. The transfer wheels $13^a$, $13^b$ and $13^c$, are formed with pockets $16^a$, $16^b$ and $16^c$ respectively, in their peripheries, said pockets being adapted to engage the cans $9^a$, $9^b$ and $9^c$ respectively as the same are successively carried to the ends of their respective tracks, and to elevate said cans within suitably formed guide chambers $17^a$, $17^b$ and $17^c$, and to deposit said cans upon the respective upper tracks $8^b$ $8^c$ and $8^d$. The tracks $8^a$, $8^b$ and $8^c$ terminate in slight elevations $18^a$, $18^b$ and $18^c$ respectively, so that when the cans are forced over said elevations by the last dogs 12 and 12', said cans roll by gravity into the guide chambers $17^a$, $17^b$ and $17^c$, and are readily picked up by the pockets of the transfer wheels. It is understood that said transfer wheels make one revolution for every complete stroke of the rods 11 and 11'. As shown in Fig. 2 of the drawings, the transfer wheel $13^b$ and its associated guide cylinders $17^b$ are positioned entirely within the cooker body, and between the first and last can tracks $8^a$ and $8^d$; the dogs 12 and 12' immediately adjacent said transfer wheel $13^b$ are therefore cut off on their upper lower sides respectively, as shown at 19, to prevent interference with said transfer wheel and guide cylinder.

The cans are fed into the cooker from a feed chute or trough 20, Figs. 1, 2 and 7 of the drawings, it being understood that said cans are placed in said trough, four abreast, by any suitable means, not shown in the drawings. The floor of the feed trough 20 is downwardly inclined toward the valve chamber 6, as shown in Figs. 2 and 7, and terminates at an aperture, or more properly at four adjacent apertures, 21 in the forward wall of said valve chamber 6. The valve 7 comprises a flat plate occupying the entire chamber 6, and extending the entire width of the tank. Said valve is formed near its lower end with an inclined aperture 22 positioned in lateral alinement with each feed aperture 21 in the front wall of said chamber, and is vertically movable within its chamber, as before stated; and when said valve is at the lower limit of its movement the apertures 22 therein are in vertical alinement with the feed apertures 21, so that in this position of the valve the lowermost cans within the feed trough roll by gravity into the apertures 22 in said valve, one of said cans being shown at $9^e$ in Fig. 7. The width of the valve 7 is only slightly greater than the diameter of the can $9^e$, so that but one can can enter each aperture 22 upon each stroke of the valve. Upon the upward movement of said valve 7, the apertures 22 therein are brought into registry with the interior of the cooker tank 1, as shown in Fig. 2, and the cans $9^e$ roll by gravity out of said apertures 22 and onto the lower tracks $8^a$, where they are engaged by the first dogs 12 of the lower advance rods 11.

The valve 7 is also provided with a series of four transversely alined apertures 23 inclined oppositely to the apertures 22, and positioned in the upper portion of said valve. At the lower limit of the movement of said valve, said apertures 23 are in vertical alinement with the upper can tracks $8^d$, and the end-most cans upon said tracks are pushed into said aperture by the end-most dogs 12', one of said cans being shown at $9^f$ in Fig. 7 of the drawings. The valve 7 is then raised, the inclination of the aperture 23 holding the cans $9^f$ therewithin, and at the upper limit of the movement of said valve, the apertures 23 come into registry with apertures 23, Figs. 2 and 7, formed in the forward wall of the valve chamber 6, and leading into a cooling tank 25. In this position of the valve, the can $9^f$ rolls by gravity out of the aperture 23 in said valve and into the cooling tank 25, as shown in Fig. 2. A pipe connection 26 is shown in said Fig. 2 for supplying water to said cooling tank.

The tank 1 of the cooker, is understood to contain either water or steam at a relatively high temperature, the degree of temperature depending on the character of the food to be cooked. In the drawings I have shown the tank as containing a small quantity of water 27, Figs. 2 and 3 of the drawings, the remainder of the tank being preferably filled with steam at high pressure. Pipe connections 28 and 29 are shown in Figs. 2 and 3 for supplying steam and water to the tank. It is to be noted that the valve 7 is approximately steamtight, the only steam or water which can escape therethrough being that which fills the apertures 22 and 23; the water which escapes in the aperture 22 will lie within the lower portion of the feed trough 20, as shown in Fig. 7, and the steam which escapes in the aperture 23 passes out through the cooling tank 25.

The various parts of the machine are operated by a drive shaft 30, Figs. 1 and 2 of the drawings, positioned transversely above the valve 7, and carrying upon one end a pulley 31, and adjacent thereto, a gear-pinion 32; and a similar gear pinion 33 is carried upon the opposite end of said shaft. The pinions 32 and 33 mesh with gears 34 and 35 respectively, carried upon short transverse shafts 36 and 37 respectively, one of which is shown in Fig. 6 of the drawings. Said shafts 36 and 37 are suitably journaled at 38 in the posts or brackets 39 which support the drive shaft 30, and carry upon their inner ends crank disks 40. A crank pin 41 extends between said disks and has journaled upon it connecting rods 42, whose lower ends are pivotally connected at 43 with the valve member 7, so that by the rotation of said shafts 36 the valve 7 is raised and lowered. The gear 34 has formed upon it connecting rods 42, whose lower ends are pivotally connected at 43 with the valve member 7, so that by the rotation of said shafts 36 the valve 7 is raised and lowered. The gear 34 has formed upon its hub a bevel gear 44, Figs. 6 and 7 of the drawings, which meshes with a similar bevel gear 45 carried upon the end of a lineal inclined shaft 46 Figs. 1, 2 and 7. Said shaft extends to the rear end of the machine and carries upon its end a bevel pinion 47, Figs. 1 and 2, adapted to mesh with a similar pinion 48 carried upon one end of the upper transfer wheel shaft 14°. Said shaft 14° at its opposite end carries a spur gear 49, Figs. 1, 4 and 5 of the drawings, which drives, through an idler gear 50, a similar gear 51 mounted upon the end of the lower transfer wheel shaft 14ª, so that said transfer shafts 14ª and 14° are rotated in the same direction and in unison. The transfer wheel shaft 14ᵇ, at the forward end of the tank, carries a bevel gear 52 upon one end, as shown in Figs. 2 and 6 of the drawings, which meshes with a similar gear 53 carried upon the lower end of an inclined upwardly extending shaft 54, whose upper end carries a bevel gear 55, the latter meshing with a similar gear 56 mounted upon the lineal inclined shaft 46 near the forward end thereof. A bracket 57 supports the forward end of said shaft 46 and the upper end of said shaft 54.

The transfer wheel shafts 14ª and 14° carry at each end cam members 58 and 58' respectively, Figs. 4 and 5 of the drawings, and extending laterally from the faces of said cam members are crank pins 59 and 59'. Connecting rods 60 and 60' connect said crank pins with transverse bars 61 and 61' respectively, within which the lineal can advancing rods 11 and 11' are rotatably mounted, the lower rods 11 being secured to the lower bar 61 and the upper rods 11' being secured to the upper bar 61'. Said rods 11 and 11' are provided with adjustable collars 62 and 62' lying upon either side of the bars 61 and 61' respectively, so that said rods are moved by the fore and aft movement of said bars 61 and 61', the latter being moved by the cranks 58 and 58'. The rods 11 and 11' are provided with elongated pinions 63 and 63', Figs. 2 and 5 of the drawings, with which transversely disposed rack bars 64 and 64' are adapted to mesh. Said rack bars are carried by bell-cranks 65 and 65', the upper pair 65' being shown in Fig. 1 of the drawings and the lower pair being similarly mounted. Said bell-cranks carry upon their other arms cam rollers 66 and 66' which follow the cams 58 and 58', so that said rack bars 64 and 64' are given a transverse reciprocating motion at the proper times in the lineal reciprocating movement of the rods 11 and 11'. By this mechanism, the rods 11 and 11' are oscillated at each end of their lineal movement to bring the dogs 12 and 12' into engagement with the proper line of cans, as previously described.

The operation of the machine may be briefly summarized as follows:—

Cans are placed in the feed trough 20 in a horizontal position, four abreast, by any suitable means, not illustrated, and roll by gravity down the inclined floor of said trough and are stopped by the valve 7. When said valve reaches the lowest limit of its movement, the four lowermost cans within the feed trough 20, roll into the ports 22 in said valve, as shown at 9ᵉ in Fig. 7 of the drawings. Said valve is then elevated and said cans roll out into the interior of the cooker tank 1, and on to the lower tracks 8ª, Figs. 2 and 3 of the drawings. Said cans are then engaged by the lower dogs 12, carried by the lower reciprocating and oscillating rods 11, and are successively advanced, step by step, by the reciprocating and oscillating movement of said rods, along the lower tracks 8ª, as shown at 9ª, Figs. 2 and 7. At the rear end of said lower tracks 8ª, the cans are forced into the guide chamber 17ª, and are picked up therein by the pockets 16ª of the transfer wheels 13ª, and are elevated by said transfer wheels and deposited upon the second tracks 8ᵇ. The cans now numbered 9ᵇ are advanced forwardly along said second tracks 8ᵇ by the lower dogs 12, moving one step at each forward stroke of the rods 11. At the forward end of said second tracks 8ᵇ, the cans 9ᵇ are placed within the guide chamber 17ᵇ, and are engaged and elevated by the transfer wheels 13ᵇ, and deposited upon the third tracks 8ᶜ. The cans, now numbered 9ᶜ, are engaged by the upper dogs 12′ and are moved rearwardly along said third tracks 8ᶜ, step by step, by the successive rearward strokes of the upper rods 11′, and are carried at the ends of said tracks into the guide chamber 17ᶜ. The transfer wheels 13ᶜ then engage said cans and elevate the same on to the fourth tracks 8ᵈ, along which said cans, now numbered 8ᵈ, are successively advanced by the successive forward movements of the upper dogs 12′. At the forward end of said fourth tracks 8ᵈ, the cans are placed within the upper ports 23 of the valve 7, Fig. 7 of the drawings. Said valve then moves upwardly and the cans now designated as 9ᶠ roll out of said ports 23, as shown in Fig. 7, and into the cooler 25, from which they may be removed in any manner, not shown in the drawings. It is understood, that the drive mechanism is so designed and proportioned that the various moving parts of the machine are operated in the proper time relation.

The invention has been hereinbefore described and is herewith illustrated in its preferred form. I do not wish to be understood as limiting myself in this regard however, for the reason that many changes of form and construction may be made in the device without departing from the spirit of the invention. On the contrary, it is my wish to be understood as claiming the invention as broadly as the state of the art will permit.

Having thus described my invention what is claimed as new and desired to be protected by Letters Patent is:—

1. A cooker comprising a tank, means for feeding cans thereto and discharging the same therefrom, a track within said tank for conveying said cans therethrough, a rod mounted parallel to said track and adapted for lineal reciprocating movement and angular oscillating movement, a series of spaced dogs projecting laterally from said rod, and mechanism for reciprocating and oscillating said rod to cause said dogs to engage the cans and to move the same forward along said track in a series of successive step movements.

2. A cooker comprising a tank, means for feeding cans thereto and discharging the same therefrom, a track within said tank for conveying the cans therethrough, a movable rod positioned parallel to said track, a series of spaced dogs extending laterally from said rod, and mechanism for reciprocating said rod lineally and for oscillating the same angularly to cause said dogs to engage said cans upon the lineal movement of said rod in one direction only.

3. A cooker comprising a tank, a plurality of superposed horizontal parallel tracks adapted to guide a can through said tank, means for feeding a can to the beginning of the lowermost track, means for discharging said can from the end of the uppermost track, mechanism movable into operative relation with one of said tracks and then with the other of said tracks for advancing said can along said respective tracks by a series of lineally successive step movements, and devices for transferring said can from the end of each track to the beginning of the track next above.

4. A cooker comprising a tank, a plurality of superposed horizontal tracks adapted to form a continuous path for conveying a can through said tank, means for feeding the can to the beginning of said tracks and discharging the same from the end thereof, mechanism common to adjacent superimposed tracks and capable of alternate coöperative movement into operative relation with the respective adjacent superimposed tracks for engaging and advancing said can along said tracks by a series of lineally successive step movements, and devices for transferring said can from one to the other of said tracks.

5. A cooker comprising a tank, a horizontal track within said tank adapted to direct a can, a second horizontal track positioned above said first track, means for feeding a can to one end of said first track, devices for transferring said can from the other end of said first track to said second track, reciprocating mechanism common to both of said tracks and capable of alternate coöperative movement into operative relation with the respective tracks for advancing said can by a series of successive step movements in one direction along the first track and in an opposite direction along the second track and means for discharging said can from the second track.

6. A cooker comprising a tank, a pair of parallel horizontal tracks therewithin adapted to direct a can through said tank, means for feeding a can to one end of one of said tracks, devices for transferring said can from the other end of said track to the other track, lineally and laterally reciprocating mechanism common to both of said tracks and capable of alternate coöperative movement into operative relation with the respective tracks for advancing said can thereover in opposite directions by a series of successive step movements and means for discharging said can from the second track.

7. A cooker comprising a tank, a pair of parallel tracks therewithin adapted to direct a can, devices for transferring a can from one of the other of said tracks, and reciprocating mechanism common to both of said tracks and capable of alternate coöperative movement into operative relation with the cans on the respective tracks for advancing said can by a series of successive step movements in one direction upon one track and in an opposite direction upon the other of said tracks.

8. A cooker comprising a tank, a pair of parallel tracks therewithin adapted to direct a series of cans, means for feeding cans successively to one track and discharging the same from the other track, devices for transferring the cans successively from the first to the second track, a plurality of interconnected movable dogs associated with said tracks, and mechanism for reciprocating said dogs lineally and transversely with respect to said tracks to cause the same to alternately engage and advance the cans upon said two tracks.

9. A cooker comprising a tank, a pair of parallel tracks therewithin adapted to direct a series of cans, means for feeding said cans successively to one of said tracks and removing the same from the other track, devices for transferring said cans from one to the other of said tracks, a lineally disposed rod common to both of said tracks, a series of spaced laterally extending dogs carried by said rod, and mechanism for oscillating said rod to cause said dogs to alternately engage the cans upon the two tracks and for lineally reciprocating said rod to alternately advance said cans upon said two tracks.

10. A cooker comprising a tank, a plurality of pairs of parallel tracks within said tank adapted to direct a series of cans therethrough, means for feeding cans successively to said tracks and discharging the same therefrom, a lineally disposed rod associated in operative relation with each pair of tracks, a series of spaced laterally projecting dogs carried by said rods, mechanism for oscillating said rods to cause said dogs to alternately engage the cans upon the two tracks of each pair of tracks, mechanism for lineally reciprocating said rods for causing said dogs to advance said cans alternately upon the two tracks of each pair of tracks, and devices for automatically transferring said cans between said tracks.

11. A cooker comprising a tank having its interior formed into a plurality of superposed longitudinal run-ways, means for admitting steam into said tank, slide means controlling the admission of cans within the tank and the discharge therefrom, a single reciprocating mechanism common to both of said runways and capable of alternate coöperative movement into operative relation with the cans on the respective runways for advancing the cans in opposite directions through the superposed run-ways by a series of successive step movements, and rotatable means for transferring the cans successively from one to another of the said run-ways.

12. A cooker comprising a tank, a pair of parallel tracks therewithin adapted to direct a can, rotatable means for transferring a can from one to the other of said tracks, slide means controlling the admission of cans into the tank and the discharge therefrom, and reciprocating mechanism intermediate of and common to both of said tracks for advancing said cans by a series of successive step movements in one direction upon one track and in an opposite direction upon the other of said tracks.

In testimony whereof I have signed my name to this specification in the presence of two subscribing witnesses.

AXEL JOHNSON.

Witnesses:
 N. A. ACKER,
 D. B. RICHARDS.